United States Patent
Vaughan et al.

[19]

[11] Patent Number: 6,011,592
[45] Date of Patent: *Jan. 4, 2000

[54] COMPUTER CONVERGENCE DEVICE CONTROLLER FOR MANAGING VARIOUS DISPLAY CHARACTERISTICS

[75] Inventors: Mark P. Vaughan, Spring; Derrill L. Sturgeon; Drew S. Johnson, both of Houston, all of Tex.

[73] Assignee: Compaq Computer Corporation, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/829,733

[22] Filed: Mar. 31, 1997

[51] Int. Cl.[7] .............................. H04N 7/00; H04N 5/46
[52] U.S. Cl. .................. 348/552; 348/553; 348/554; 345/132; 345/154; 315/368.12
[58] Field of Search ................... 348/552, 806, 348/807, 745, 746, 747, 553, 554, 556; 345/112, 127, 132, 154; 315/368.11, 368.12, 368.13, 368.18, 368.24; H04N 7/00, 5/46

[56] References Cited

U.S. PATENT DOCUMENTS

| 4,658,247 | 4/1987 | Gharachorloo | 340/747 |
|---|---|---|---|
| 4,885,632 | 12/1989 | Mabey et al. | 348/13 |
| 4,954,819 | 9/1990 | Watkins | 340/721 |
| 4,958,301 | 9/1990 | Kobayashi | 345/127 |
| 5,291,275 | 3/1994 | Lumelsky | 348/441 |
| 5,448,697 | 9/1995 | Parks et al. | 395/162 |
| 5,451,981 | 9/1995 | Drako et al. | 345/118 |
| 5,488,393 | 1/1996 | Wood et al. | 345/213 |
| 5,493,317 | 2/1996 | Kim | 348/555 |
| 5,502,462 | 3/1996 | Mical et al. | 345/185 |
| 5,543,824 | 8/1996 | Priem et al. | 345/201 |
| 5,570,196 | 10/1996 | Miyaguchi | 348/553 |
| 5,627,605 | 5/1997 | Kim | 348/745 |
| 5,663,768 | 9/1997 | Yang | 348/555 |
| 5,713,040 | 1/1998 | Lee | 348/554 |
| 5,724,103 | 3/1998 | Batchelor | 348/564 |
| 5,736,971 | 4/1998 | Shirai | 348/555 |
| 5,784,123 | 7/1998 | Yoshimi | 348/556 |
| 5,819,156 | 10/1998 | Belmomt | 348/552 |
| 5,821,918 | 10/1998 | Reinert et al. | 345/154 |
| 5,835,134 | 11/1998 | Thacker | 348/552 |

OTHER PUBLICATIONS

"Gateway 2000 Sells Destination Big Screen PC Through Retail Chains"; Internet article; Aug. 20, 1996; pp. 1–4.

"Gateway 2000 Launches Destination Big Screen PC Featuring 31–inch Monitor"; Internet article; Mar. 21, 1996; pp. 1–5.

"The Big–Tube PCTV"; PC Online/Trends Online; May 28, 1996; pp. 1–3.

"Destination Features"; Internet article; Aug. 21, 1996; pp. 1–5.

"Telefuzion"; Internet article; Mar. 12, 1997; pp. 1–2.

"High–Tech; Now you can tune your TV to the Internet"; Mike Snider; USA Today; Sep. 18, 1996; pp. 1–2.

"Display Data Channel (DDC™)Standard" VESA; 1996 Video Electronics Standards Association; DDC ver.2, rev.1 (Jul. 24, 1996); pp. 1–36.

*Primary Examiner*—John K. Peng
*Assistant Examiner*—Linus H. Lo
*Attorney, Agent, or Firm*—Jenkens & Gilchrist, P.C.

[57] ABSTRACT

A computer convergence device, operable in a computer mode and, for example, a television mode, includes a computer, a display monitor for displaying images in both the computer mode and the television mode, and multiple video inputs for receiving various types of video signals, each being selectable during operation in television mode. A controller device is coupled to the computer for independently controlling and storing user selected video geometry settings for both the computer mode and the television mode, and further for independently controlling and storing user selected video quality settings for the computer mode, and each of the various video inputs.

20 Claims, 3 Drawing Sheets

COMPUTER CONVERGENCE DEVICE CONTROLLER FOR MANAGING VARIOUS DISPLAY CHARACTERISTICS

BACKGROUND OF THE INVENTION

1. Field of the Invention

The present invention relates to computer convergence devices, and more particularly, but not by way of limitation, to a personal computer/television (PC/TV) convergence device controller for managing the various display geometry and quality characteristics that are available during various operating modes and among various video input sources.

2. Description of Related Art

A computer convergence device is a fully functional computer integrated or converged with another consumer electronic device. One such convergence device is a personal computer/television (PC/TV) convergence device, which integrates a personal computer with television functionality, providing television viewing (via broadcast, cable, Digital Satellite, video cassette recorder (VCR), electronic game device, or other video source) and personal computing functionality. The convergence of a personal computer and television functionality, among other things, permits combined access to television viewing and program information, computer related functionality, and Internet access.

A PC/TV convergence device may comprise a fully function computer including fax/modems, CD-ROM players, and media storage such as hard drives and floppy drives. The convergence with television functionality includes utilizing multiple video inputs to receive a variety of video signals such as from cable systems, VCR, and electronic game machines. The computer is interfaced with a display monitor, often a big screen monitor, with either the interlaced video signal being converted to a scan video graphics adapter (VGA) signal or the computer's scan VGA signal being converted to an National Television Standards Committee (NTSC) interfaced signal. Because the PC/TV convergence device is controlled by the computer's operating system, the PC/TV convergence device can, among other things, simultaneously display PC applications and TV programs on a single monitor. The convergence of personal computer and television functionalities into a single device also permits the utilization of the communications bandwidth, mass storage and graphics of the computer to deliver, store and display small computer applications during a traditional television viewing environment.

In spite of many recent advances in this area, several problems remain. One problem relates the differences between the video geometry settings used to display computer applications and those used to display video applications. The video geometry settings include the physical sizing of the display as well as the display mode (e.g., overscan and underscan modes). Typically, a display for displaying computer applications will require a completely different set of video geometry setting characteristics than a display for displaying television or video applications. In fact, not only are the settings different, but the range of values are often different as well.

Another problem relates to the differences of the video quality characteristics among the various video signals selectable to be displayed on the display monitor. Video quality characteristics include the characteristics that effect the quality of the displayed image, such as the black level, color and contrast of the video signal. For example, computer applications will typically have a lower black level and lower contrast level than a typical VCR video signal. This is because computer applications tend to have more static displays than video applications, and thus by lowering the black level and contrast level display monitor screen burns are prevented. In addition, there are differences in the video quality characteristics between various video signals. Similarly, a video signal received from a cable system source may be at a different level than a VCR video signal or a digital satellite signal.

Accordingly, based upon the foregoing, it should be appreciated that there is a need for a computer convergence control system that is capable of controlling the various display requirements for the various modes of operation of the computer convergence control systems as well as for the varying video signals received by the computer convergence system. That is, it would be advantageous to provide a video controller that can readily control the video geometry and video quality characteristics depending upon the selection of the mode of operation as well as the selection of the video source.

SUMMARY OF THE INVENTION

The present invention overcomes the above identified problems as well as other shortcomings and deficiencies of existing technologies by providing a computer convergence device that is operable in a first mode and at least a second mode. The computer convergence device includes a computer for selecting operation in either the first mode or the second mode, an output device coupled to the computer, with the output device outputting information generated during operation in the first mode and the second mode with the output device having a plurality of output characteristics. A control device is coupled to the computer, and is operable to vary at least one of the plurality of output characteristics corresponding to operation in the first mode and further operable to vary at least one of the plurality of output characteristics corresponding to operation in the second mode.

The present invention further provides a computer convergence device, operable in a computer mode and a television mode. The computer convergence device includes a computer, a display monitor for displaying images in both the computer mode and the television mode, and multiple video inputs for receiving various types of video signals, each of the multiple video inputs being selectable during operation in television mode. A controller device is coupled to the computer for independently controlling and storing user selected video geometry settings for operation in both the computer mode and the television mode, and further for independently controlling and storing user selected video quality settings for operation in the computer mode, and for operation in television mode for each of the various video inputs.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
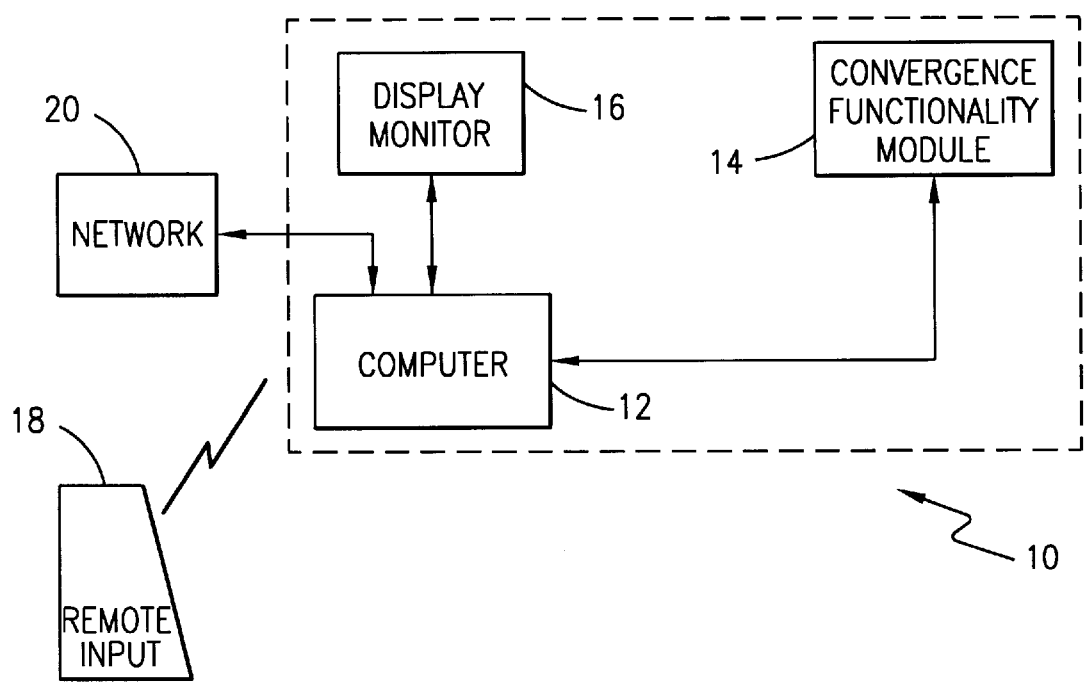
FIG. 1 is a block diagram illustrating a computer convergence system in accordance with the principles of the present invention.

With reference now to the figures wherein like or similar elements are designated with identical reference numerals, there are depicted block diagrams illustrating the present invention. The purpose of these block diagrams is to illustrate the features of the invention and the basic principles of operation of an embodiment thereof These block diagrams are not necessarily intended to schematically represent particular modules of circuitry or any particular data or control paths.

Referring now to FIG. 1, there is shown a block diagram illustrating a computer convergence system 10. Computer convergence system 10 includes a computer 12, a convergence functionality module 14, a display monitor 16 and a remote input 18.

Computer 12 may preferably be a personal computer, and although not shown, includes a processor, memory, data retrieval and storage media and communication data ports. Display monitor 16 is operable to receive and display video signals received from computer 12 and may include an audio output system for playing audio signals received from computer 12.

Computer 12 is coupled to convergence functionality module 14 that is operable to receive or generate data signals, such as video, audio, and graphic information. For example convergence functionality module 14 may comprise a receiver, decoder or tuner capable of receiving television signals in the form of the National Television Standards Committee (NTSC) or Phase Alternate Line (PAL) forms, from any medium such as from a cable system or from a digital satellite system. Convergence functionality module 14 may also include or consist of various other types of consumer electronic units. For example, convergence functionality module 14 could also include or consist of video gaming units and other direct audio/video sources such as video cassette recorders (VCRs), and video disk player/recorders, including digital versatile disk (DVD) player/recorders.

Computer convergence system 10 may preferably be operated by a user using wireless remote input 18 operating, for example, via radio waves, infrared waves or acoustic waves. Although good results have been achieved using wireless keyboards and remote controls for remote input 18, it is contemplated that any input device, wireless or hardwired, could be used to operate computer convergence system 10.

Still referring to FIG. 1, computer convergence system 10 is configurable to be connected and communicate with a network 20. It is contemplated that network 20 could be any type of network, including a Local Area Network, a Wide Area Network and the Internet.

In general operation, computer convergence system 10 can be operated in various modes. For example, computer convergence system 10 can be operated in a personal computer mode and a television mode. When in television mode, personal computer 12 processes the audio and video information received or generated by convergence functionality module 14, and outputs the corresponding information on display monitor 16. At least two viewing surfaces are possible when computer convergence system 10 is being operated in television mode, a primary viewing surface and a secondary viewing surface. The displayed image of the primary viewing surface fills the entire viewing screen, with only a portion of the screen dedicated to the viewing of the secondary viewing surface, such as a picture-in-picture (PIP).

When computer convergence system 10 is being operated in computer mode, computer 12 is utilized to perform computer functions, including executing and running software and interfacing with network 20, with the output of computer 12 being displayed on display monitor 16.

Figure 2:
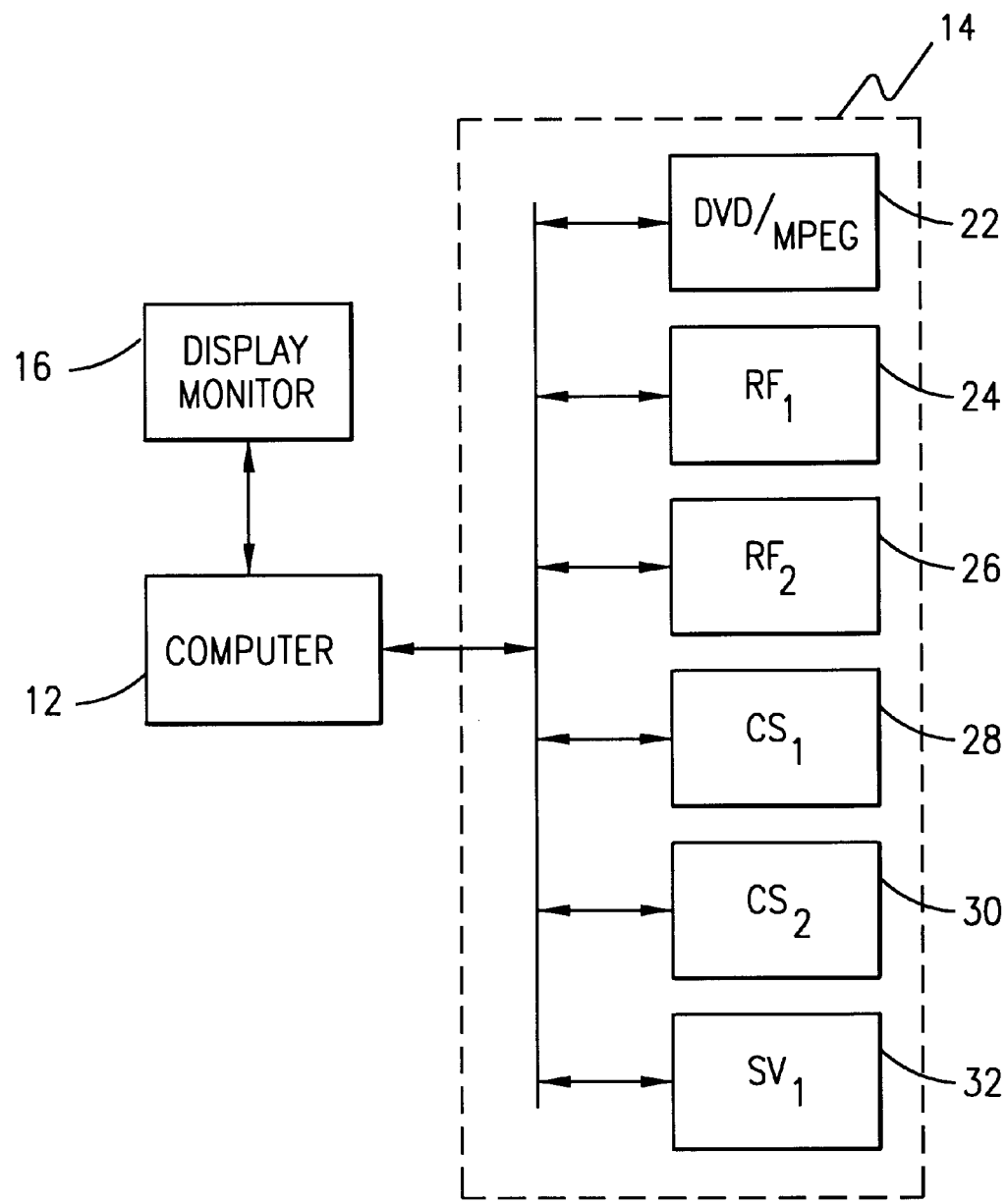
FIG. 2 is a block diagram illustrating an embodiment of the convergence functionality module of the computer convergence system as similarly illustrated in FIG. 1.

Referring now to FIG. 2, there is shown a more detailed block diagram of an exemplary embodiment of computer convergence system 10. As depicted in this exemplary embodiment, convergence functionality module 14 includes multiple video inputs 22, 24, 26, 28, 30 and 32 capable of receiving a variety of video signals. For example, inputs 22–32 could be configured as follows: input 22 to receive digital signals such as DVD/DSS video signals; inputs 24 and 26 to receive RF video signals such as from a cable television system; inputs 28 and 30 to receive composite video signals such as from a VCR; and input 32 an S-Video signal such as from a laser disk player. Although convergence functionality module 14 is illustrated in this exemplary embodiment to include the inputs to receive the video signals from various video sources, it is contemplated that convergence functionality module 14 could also include the corresponding video players, recorders, tuners, and decoders.

Figure 3:
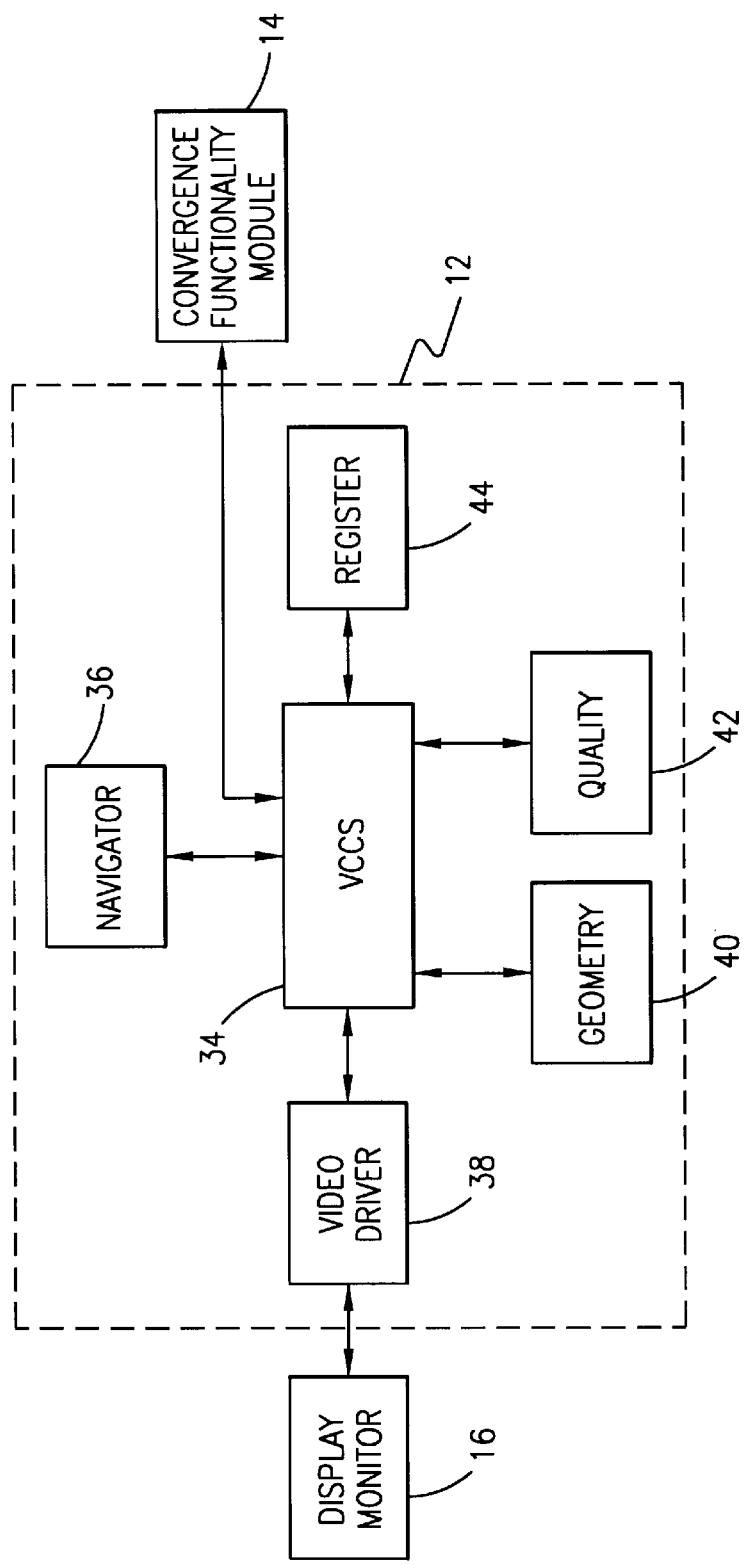
FIG. 3 is a block diagram illustrating an embodiment of the video output controls utilized by the computer convergence system as similarly illustrated in FIG. 1.

Referring now to FIG. 3, there is illustrated a more detailed block diagram of video output controls utilized by computer 12 to process the video signals received from convergence functionality module 14. As depicted, the video output controls of computer 12 include a video center control service (VCCS) 34, a navigator 36, a video driver 38, video display geometry settings 40, video display quality settings 42, and a register 44. VCCS 34 is the central service that provides control for video applications received from convergence functionality module 14. All messages and commands that query or manipulate video applications are also processed and/or routed by VCCS 34. Navigator 36 communicates messages with VCCS 34 in response to a user's input to select a video source or to manipulate the output characteristics of the video signals. Video driver 38 processes the video signal to be displayed on display monitor. Video display geometry settings 40 are the settings that control the physical geometry of the displayed output on display monitor. They include the horizontal and vertical position settings, the horizontal and vertical size settings, the vertical pincushion setting, overscan and underscan modes and the tilt setting. Video display quality settings 42 are the settings that control the physical quality of the displayed output on display monitor 16. They include the brightness, contrast, color, hue, sharpness and color temperature. It is contemplated that various other display controls could also be controlled by VCCS 34, such as the trapezoidal adjustment. Register 44 stores the default and user selected video display geometry settings and the default and user selected video display quality settings 42, as well as the minimum and maximum ranges for each of these settings.

Referring now to FIGS. 2 and 3, a more detailed description of the operation of the present invention will now be given. As described hereinabove, in one exemplary embodiment, computer convergence system 10 is operable in two modes, a computer mode and a television mode. Upon initialization of computer convergence system 10, VCCS 34 will open a primary viewing surface on display monitor 16 and set the primary viewing surface to display the video information from the selected input video source, such as RFI. VCCS 34 will also set the video display settings to the last saved value stored in register 44 (for that selected video source). When a new video input source is selected by a user, navigator 36 sends a message to VCCS 34. VCCS 34 then changes to the selected source via a call to the video driver 38. The identification for the current video source is stored in register 44, so that if the unit is rebooted, the primary viewing surface will come up in the last selected video source.

When the secondary viewing surface, such as a PIP, is activated by a user, VCCS 34 will check register 44 for a previously chosen video source setting for the PIP and set it accordingly. In the current preferred embodiment, any of the video sources can be selected for the PIP video setting, as long as the selected video source is not currently locked. If a video source had not been previously chosen, VCCS 34 will set the PIP source, via the video driver, to the same video source as the primary viewing surface. It is contemplated that VCCS 34 may be set to restrict the video source selection for the PIP so that the source is not a duplicate source of the primary viewing surface. VCCS 34 also controls the swapping of the primary viewing surface with the secondary viewing surface.

Because the various video sources may each have different output video signal levels, VCCS 34 also controls the modifications to the video display quality settings 42, including the display color, hue, brightness, contrast, color temperature, and sharpness for each of the video sources. The settings for each of the video sources are saved in register 44. Default settings for each of the video display quality settings 42 are also stored in register 44. VCCS 34 will read and apply the video display quality settings 42 upon initialization of computer convergence system 10. When a user modifies any of the video display quality settings 42, VCCS 34 will make the appropriate changes as the user makes the changes. Any changes made to the video display quality settings 42 will also be stored in register 44.

Similarly, when computer convergence system 10 is being operated in computer mode, VCCS 34 also controls the video display quality settings 42 for the computer mode. Default settings, the current settings and any changes made to the video display quality settings 42 when computer convergence system 10 is operating in computer mode are also stored in register 44. It is contemplated that if computer convergence system 10 were operated in computer mode with multiple video sources, VCCS 34 could also control the video display quality settings 42 for each of the various video sources.

To recapitulate, the video display quality settings 42 can be chosen, modified and saved for the operation of computer convergence system 10 in computer mode, and similarly can be independently chosen, modified and saved for each video source when computer convergence system 10 is operating in television mode.

As can be appreciated, depending upon the capabilities of the display monitor 16, the type of signal being displayed on display monitor, and depending upon the characteristics of the video signal received and video signal inputs 22–32, the type and number of video display quality settings 42 available may vary accordingly.

VCCS 34 also independently controls the video display geometry settings 40 when computer convergence system 10 is operating in either the computer mode or the television mode. In particular, video display geometry settings 40 include the vertical and horizontal position settings, the vertical and horizontal size settings, the vertical pincushion setting, the scan mode (overscan/underscan), and the tilt setting. For example, most software is designed to be displayed with a display monitor operating in underscan mode, while the television viewing is best viewed when the display monitor is operating in overscan mode. Therefore, the scan mode video display geometry setting 40 can be independently set to underscan mode when computer convergence system 10 is operating in computer mode and also set to overscan mode for when computer convergence system 10 is operating in television mode. As with the video display quality settings 42, each of the settings for the video display geometry settings 40 are stored in register 44, such that when a user switches between computer mode and television mode, VCCS 34 will apply the corresponding saved video display geometry settings 40 for the selected mode.

Base upon the foregoing, it should be appreciated that the computer convergence system 10 provided in accordance with the principles of the present invention is operable in at least two modes and includes a computer, a display monitor, and a video controller. In the first mode ("computer mode") of operation, the video controller, controls the video geometry settings and the video quality settings based upon settings stored in a register. If any of these settings are changed by the user, the video controller changes the settings accordingly and saves the new settings in the register. In the second mode ("television") of operation, the video controller controls and saves the video geometry settings and further independently controls and saves the video quality settings for each video source or input.

Although a preferred embodiment of the apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A computer convergence device operable in a computer functionality mode and a non-computer functionality mode, said computer convergence device comprising:

a computer for selecting operation in either the computer functionality mode or the non-computer functionality mode;

an output device coupled to said computer, said output device for outputting information generated during operation in the computer functionality mode and the non-computer functionality mode, said output device having a plurality of output characteristics;

a control device coupled to said computer, said control device operable to vary at least one of said plurality of output characteristics corresponding to operation in the computer functionality mode and said control device further operable to vary at least one of said plurality of output characteristics corresponding to operation in the non-computer functionality mode; and a memory device connected to said computer, said memory device for storing a first video quality setting and a second video quality setting, the first video quality setting corresponding to the computer functionality mode and the second video quality setting corresponding to the non-computer functionality mode;

wherein said control device receives an indication of the first video quality setting responsive to operation in the computer functionality mode so that said control device varies at least one of the plurality of output characteristics according to the first video quality setting and wherein said control device receives an indication of the second video quality setting responsive to operation in the non-computer functionality mode so that said control device varies at least one of said plurality of output characteristics according to the second video quality setting.

2. The computer convergence device as recited in claim 1, wherein the first video quality setting includes default settings for each of the plurality of output characteristics.

3. The computer convergence device as recited in claim 2, wherein the first video quality setting includes user-defined settings for each of the plurality of output characteristic.

4. The computer convergence device as recited in claim 1, wherein said plurality of output characteristics include at least one display-quality characteristic corresponding to said display monitor.

5. The computer convergence device as recited in claim 2, further comprising a plurality of video inputs coupled to said computer, each of said plurality of inputs for receiving video information and wherein said output device outputs said video information received at said at least one of said plurality of video inputs on said display monitor when operating in the non-computer functionality mode.

6. The computer convergence device as recited in claim 5, wherein said control device is further operable to independently vary at least one of said plurality of output characteristics corresponding to said video information received at each of said plurality of video inputs.

7. The computer convergence device as recited in claim 6, wherein said output device includes a display monitor for displaying information generated during operation in the computer functionality mode and the non-computer functionality mode.

8. The computer convergence device as recited in claim 7, wherein said output characteristics include at least one display-geometry characteristic corresponding to said display monitor.

9. A computer system comprising:

a computer operable in a first mode;

a convergence device integrated with said computer, said convergence device operable in a second mode;

an output device coupled to said computer, said output device for outputting information generated during operation of said computer in said first mode and for outputting information generated during operation of said convergence device in said second mode, said output device having a plurality of display quality characteristics; and a control device coupled to said computer, said control device operable to vary at least one of said plurality of display quality characteristics corresponding to operation of said computer in said first mode and said control device further operable to vary at least one of said plurality of display quality characteristics corresponding to operation of said convergence device in said second mode; and a memory device connected to said computer, said memory device for storing a first video quality setting and a second video quality setting, the first video quality setting corresponding to the first mode and the second video quality setting corresponding to the second mode;

wherein said control device receives an indication of the first video quality setting responsive to operation in the first mode so that the control device varies at least one of said plurality of display quality characteristics according to the first video quality setting and wherein said control device receives an indication of the second video quality setting responsive to operation in the second mode so that the control device varies at least one of said plurality of display quality characteristics according to the second video quality setting.

10. The computer system as recited in claim 9, wherein the first video quality setting includes default settings for each of the plurality of display quality characteristics.

11. The computer system as recited in claim 9, wherein the first video quality setting includes user-defined settings for each of the plurality of display quality characteristics.

12. The computer system as recited in claim 9, wherein said convergence device includes a plurality of video inputs, each of said plurality of inputs for receiving video information, wherein said output device outputs said video information received at said at least one of said plurality of video inputs on said display monitor when said convergence device is operating in the second mode.

13. The computer system as recited in claim 12, wherein said control device is further operable to independently vary at least one of said plurality of display quality characteristics corresponding to said video information received at each of said plurality of video inputs.

14. The computer system as recited in claim 13, wherein said convergence device includes a video gaming unit.

15. The computer system as recited in claim 13, wherein said convergence device includes a video tape unit.

16. The computer system as recited in claim 13, wherein said convergence device includes a television tuner.

17. A computer convergence device operable in a non-computer mode and a computer mode, the non-computer mode including a pluarlity of video source operation modes, said computer convergence device comprising:

a computer for selecting operation in either the non-computer mode or the computer mode;

a display coupled to said computer, said display for displaying information generated during operation in the non-computer mode and the computer mode, said display having a plurality of output characteristics;

a video controller coupled to said computer, said controller operable to vary at least one of said plurality of output characteristics corresponding to operation in the non-computer mode and said video controller further operable to vary at least one of said plurality of output characteristics corresponding to operation in the computer mode; and a register for storing an indicator of a presently operable one of the plurality of video source operation modes;

wherein said computer, upon booting, is configured to select operation according to the stored indicator.

18. The computer convergence device as recited in claim 17, and further comprising means, coupled to said video controller, for storing information corresponding to said plurality of output characteristics during operation in the non-computer mode and in the computer mode.

19. The computer convergence device as recited in claim 18, wherein at least one of said plurality of output characteristics includes a display geometry characteristic.

20. The computer convergence device as recited in claim 17, wherein the non-computer mode is one of video mode, video gaming mode and TV mode.

* * * * *